(12) United States Patent
Jeong et al.

(10) Patent No.: US 11,458,703 B2
(45) Date of Patent: Oct. 4, 2022

(54) BARRIER FILM

(71) Applicant: LG CHEM, LTD., Seoul (KR)

(72) Inventors: Hee Joon Jeong, Daejeon (KR); Jang Yeon Hwang, Daejeon (KR); Bo Ra Park, Daejeon (KR); Sung Jin Shin, Daejeon (KR); Hee Wang Yang, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 16/767,541

(22) PCT Filed: Nov. 28, 2018

(86) PCT No.: PCT/KR2018/014774
§ 371 (c)(1),
(2) Date: May 27, 2020

(87) PCT Pub. No.: WO2019/107892
PCT Pub. Date: Jun. 6, 2019

(65) Prior Publication Data
US 2021/0114331 A1    Apr. 22, 2021

(30) Foreign Application Priority Data

Nov. 28, 2017 (KR) .......... 10-2017-0160879
Nov. 26, 2018 (KR) .......... 10-2018-0146895

(51) Int. Cl.
| B32B 3/30 | (2006.01) |
| B32B 27/06 | (2006.01) |
| C08G 77/62 | (2006.01) |
| C09D 183/16 | (2006.01) |
| B32B 7/12 | (2006.01) |

(52) U.S. Cl.
CPC ............. *B32B 3/30* (2013.01); *B32B 27/06* (2013.01); *C08G 77/62* (2013.01); *C09D 183/16* (2013.01); *B32B 7/12* (2013.01); *B32B 2255/10* (2013.01); *B32B 2255/26* (2013.01); *B32B 2262/10* (2013.01); *B32B 2307/7242* (2013.01); *B32B 2307/7265* (2013.01); *B32B 2457/206* (2013.01)

(58) Field of Classification Search
CPC ............. B32B 3/30; B32B 2307/7242; B32B 2307/7265; C08G 77/62; C09D 183/16
See application file for complete search history.

(56) References Cited

U.S. PATENT DOCUMENTS

| 2012/0114916 A1 | 5/2012 | Anderson et al. |
| 2014/0154518 A1 | 6/2014 | Kikuchi et al. |
| (Continued) | | |

FOREIGN PATENT DOCUMENTS

| CN | 104039544 | 9/2014 |
| CN | 105026141 | 11/2015 |
| (Continued) | | |

*Primary Examiner* — Joanna Pleszczynska
(74) *Attorney, Agent, or Firm* — Dentons US LLP

(57) ABSTRACT

Provided is a barrier film that includes a base layer (A), and a barrier layer (B) located on one side of the base layer and including one or more cured layers of polysilazane layers having a surface (S) of a concavo-convex structure formed by protruding particles, the barrier film having excellent barrier properties against the external environment, and excellent optical properties. The barrier film can be used for an electronic product sensitive to moisture.

15 Claims, 2 Drawing Sheets

(56) References Cited

U.S. PATENT DOCUMENTS

| | | |
|---|---|---|
| 2016/0035999 A1 | 2/2016 | Ii |
| 2016/0059261 A1 | 3/2016 | Nishio |
| 2017/0235025 A1* | 8/2017 | Harada ................. G02B 6/005 362/606 |
| 2018/0243789 A1 | 8/2018 | Yang et al. |
| 2019/0027414 A1 | 1/2019 | Ramadas et al. |
| 2019/0106595 A1 | 4/2019 | Shin et al. |

FOREIGN PATENT DOCUMENTS

| | | |
|---|---|---|
| CN | 105220564 | 1/2016 |
| CN | 106700927 | 5/2017 |
| EP | 2913355 A1 | 9/2015 |
| JP | S59-219337 | 12/1984 |
| JP | 2015-047790 | 3/2015 |
| KR | 10-20140068547 | 6/2014 |
| KR | 10-20170096883 | 8/2017 |
| KR | 10-20170113443 | 10/2017 |
| KR | 10-20170113444 | 10/2017 |
| KR | 10-20170113451 | 10/2017 |
| WO | 2014-178332 | 11/2014 |
| WO | 2015-060394 | 4/2015 |

* cited by examiner

[Figure 1a]
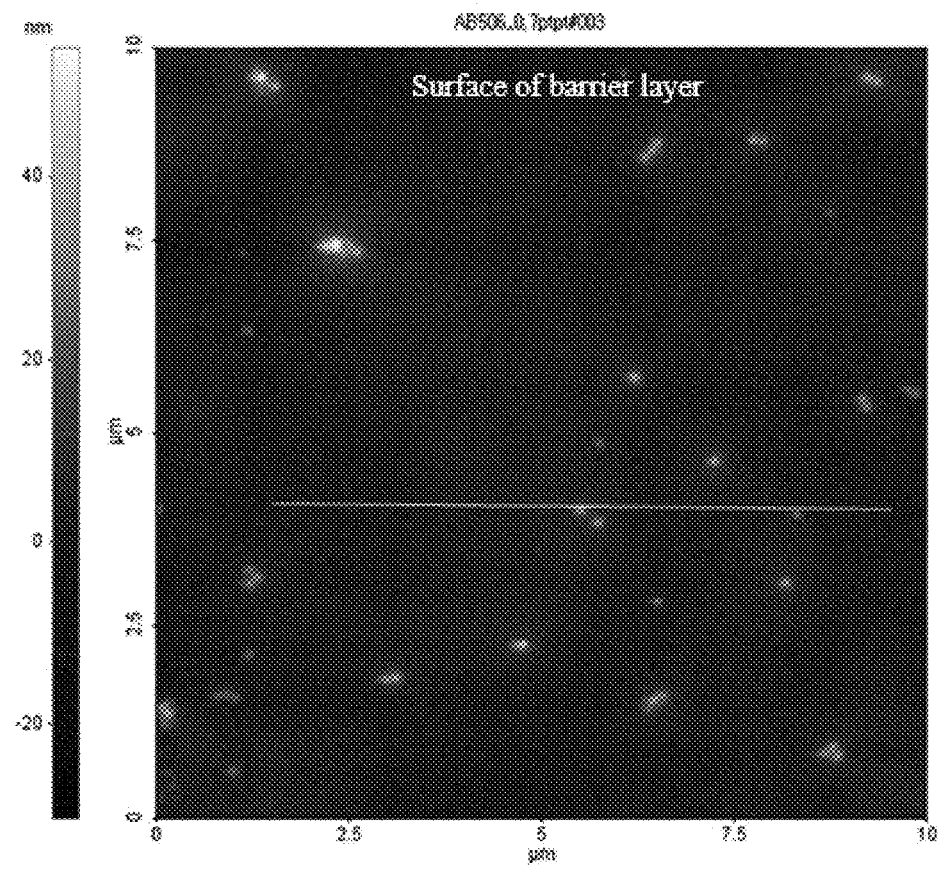
[Figure 1b]
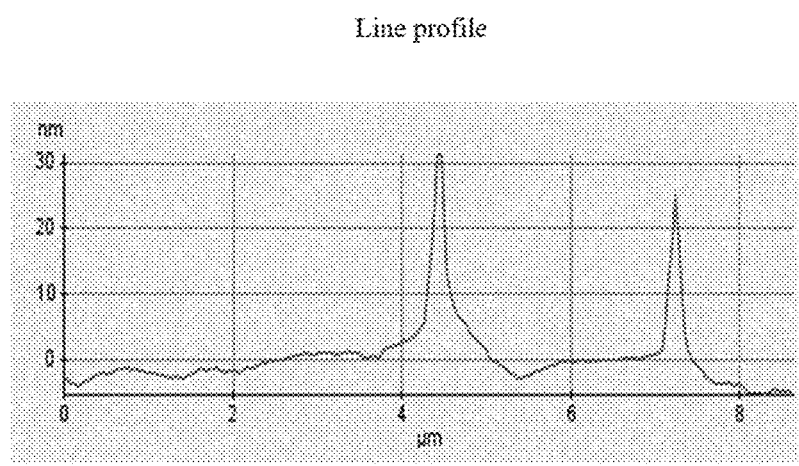

[Figure 2]
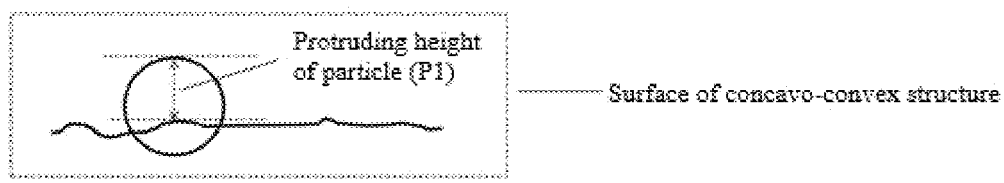
[Figure 3a]
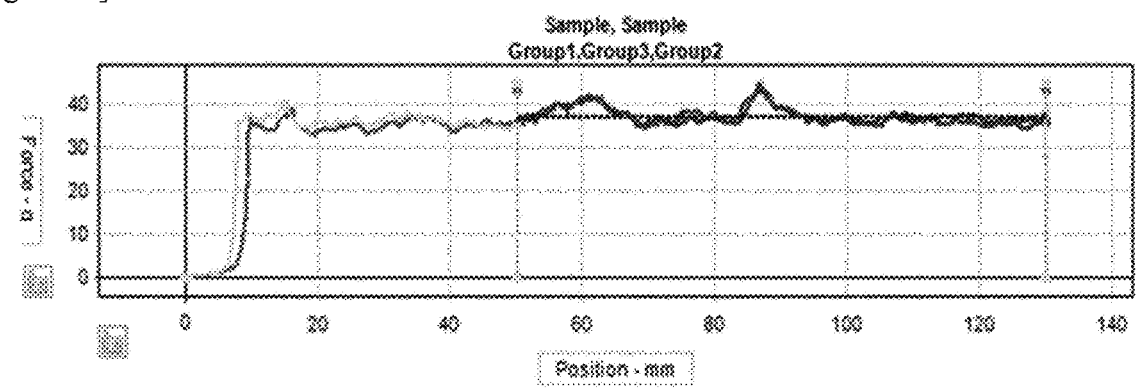
[Figure 3b]
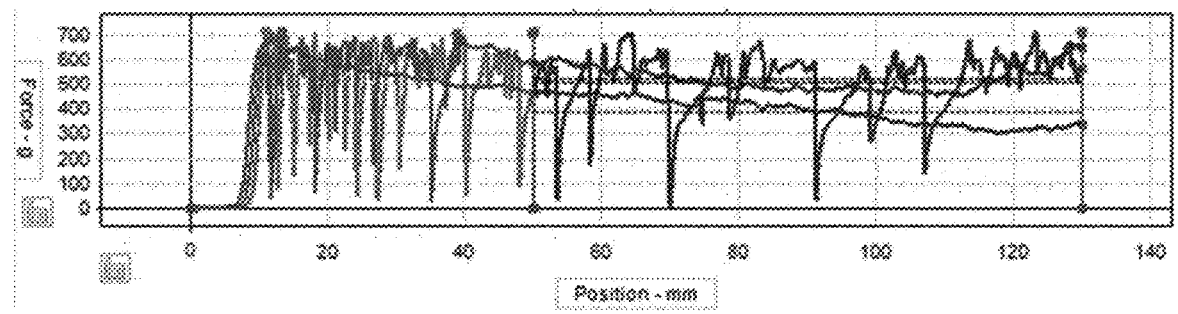

BARRIER FILM

CROSS-REFERENCE TO RELATED APPLICATION(S)

This application is a National Stage Application of International Application No. PCT/KR2018/014774 filed on Nov. 28, 2018, which claims the benefit of priority based on Korean Patent Application No. 10-2017-0160879 filed on Nov. 28, 2017 and Korean Patent Application No. 10-2018-0146895 dated Nov. 26, 2018, the disclosures of which are incorporated herein by reference in their entirety.

TECHNICAL FIELD

The present application relates to a barrier film.

BACKGROUND

A so-called barrier film having barrier properties against gas and/or moisture has various applications. For example, the film can be used, in addition to the use of packaging materials for foods or medicines and the like, for a display such as an LCD (liquid crystal display), a member for a solar cell, an electronic paper, a substrate for an OLED (organic light emitting diode), or a sealing film included in the foregoing, and the like.

The barrier film can be manufactured using dry coating or wet coating depending on the kind of materials having the barrier properties. For example, when the barrier properties are mainly imparted to the film by an inorganic material such as a metal, the barrier film can be produced by a dry coating such as physical vapor deposition (PVD) or chemical vapor deposition (CVD). Then, when the barrier properties are mainly imparted to the film by an organic or organic/inorganic composite material, the barrier film can be produced by wet coating. In the case of the former, there is an advantage such that the thin film density can be uniform, but there is a disadvantage of high cost.

On the other hand, a roll-to-roll method can be applied to a barrier film manufacturing process. For example, while unwinding a film in which a barrier film precursor is applied on a base layer through a roll-to-roll method, the barrier film can be produced in such a manner that the precursor is cured. In such a roll-to-roll process, friction between the roll and the barrier film can cause abnormal running of the film and damage to the film, resulting in deterioration of the physical properties of the barrier film (e.g., barrier properties against moisture or air).

BRIEF DESCRIPTION

Technical Problem

It is one object of the present application to provide a barrier film having excellent barrier properties against external environment.

It is another object of the present application to improve processability of a barrier film using a roll-to-roll process.

The above objects and other objects of the present application can be all solved by the present application which is described in detail below.

Technical Solution

In one example of the present application, the present application relates to a barrier film. The barrier film comprises a base layer (A) and a barrier layer (B) located on at least one side of the base layer. The barrier layer (B) can also be formed only on one side of the base layer (A) and can also be formed on both sides of the base layer (A) facing each other.

Unless otherwise specifically defined, the term "~on" or "~above" which is used in connection with interlayer lamination positions in the present application can be used in a sense to encompass not only a case where any configuration is located just above another configuration but also a case where a third configuration is interposed between these configurations.

The kind of the base layer is not particularly limited. For example, the base layer can comprise a glass base material or a plastic base material.

In one example, the base layer can comprise a polyester film such as a polyethylene terephthalate (PET) film, a polycarbonate film, a polyethylene naphthalate film or a polyarylate film, a polyether film such as a polyethersulfone film, a polyolefin film such as a cycloolefin polymer film, a polyethylene film or a polypropylene film, a cellulose resin film such as a diacetyl cellulose film, a triacetyl cellulose film or an acetyl cellulose butyrate film, a polyimide film, an acrylic film, or an epoxy resin film and the like.

The base layer can comprise one or more of the listed films. That is, the base layer can be a single layer or a multilayer structure.

The thickness of the base layer is not particularly limited. For example, it can be selected in a range of 2 to 200 μm, in a range of 5 to 190 μm, in a range of 10 to 180 μm, in a range of 20 to 180 μm, or in a range of 20 to 150 μm.

In the present application, the barrier layer (B) comprises one or more cured layers of polysilazane to be described below. For example, the barrier layer (B) can comprise one or more cured layers of polysilazane layers having a surface (S) of a concavo-convex structure formed by protruding particles. In the present application, the surface (S) of the concavo-convex structure means a layer capable of imparting a static friction coefficient, a kinetic friction coefficient, and/or a height of protruded particles which are described below.

In one example, the barrier layer (B) can further comprise a cured layer of a polysilazane layer that does not have a surface (S) of a concavo-convex structure.

In the present application, the polysilazane layer can be, for example, as a state before curing, a layer formed by coating a polysilazane-containing composition (coating composition), which is described below, on a base layer. The cured layer is a layer formed by curing the polysilazane layer, which has barrier properties against external environment (e.g., moisture or gas).

In the present application, the polysilazane layer means a layer (a coating layer in a state before curing formed on a base layer) comprising polysilazane as a main component. The main component can mean, for example, a case where in the polysilazane layer or the polysilazane-containing composition, the ratio of polysilazane is 55% or more, 60% or more, 65% or more, 70% or more, 75% or more, 80% or more, 85% or more, or 90% or more, on the basis of weight. The weight ratio can be, for example, 100% or less, 99% or less, 98% or less, 97% or less, 96% or less, or 95% or less.

In the present application, the term "polysilazane" means a polymer in which silicon atoms (Si) and nitrogen atoms (N) are repeated to form a basic backbone. This polysilazane can be modified through predetermined treatment (for example, plasma treatment to be described below) to form silicon oxide and/or silicon oxynitride having barrier properties. Accordingly, the cured product, that is, the cured layer of the polysilazane layer contains Si, N and/or O, and has barrier properties against external environment.

In one example, the polysilazane used in the present application can comprise a unit of Formula 1 below.

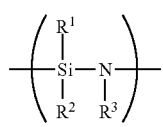

Formula 1

In Formula 1, $R^1$, $R^2$ and $R^3$ can each independently be a hydrogen atom, an alkyl group, an alkenyl group, an alkynyl group, an aryl group, an alkylsilyl group, an alkylamide group or an alkoxy group.

In the present application, the term "alkyl group" can mean an alkyl group having 1 to 20 carbon atoms, 1 to 16 carbon atoms, 1 to 12 carbon atoms, 1 to 8 carbon atoms or 1 to 4 carbon atoms, unless otherwise specified. The alkyl group can be linear, branched or cyclic. In addition, the alkyl group can be optionally substituted with one or more substituents.

In the present application, the term "alkenyl group" can mean an alkenyl group having 2 to 20 carbon atoms, 2 to 16 carbon atoms, 2 to 12 carbon atoms, 2 to 8 carbon atoms, or 2 to 4 carbon atoms, unless otherwise specified. The alkenyl group can be linear, branched or cyclic and can optionally be substituted with one or more substituents.

In the present application, the term "alkynyl group" can mean an alkynyl group having 2 to 20 carbon atoms, 2 to 16 carbon atoms, 2 to 12 carbon atoms, 2 to 8 carbon atoms, or 2 to 4 carbon atoms, unless otherwise specified. The alkynyl group can be linear, branched or cyclic and can optionally be substituted with one or more substituents.

The term "aryl group" herein can mean a monovalent residue derived from a compound comprising a structure in which a benzene ring or two or more benzene rings are linked, or condensed or bonded while sharing one or two or more carbon atoms, or a derivate thereof, unless otherwise specified. In this specification, the range of the aryl group can also include a so-called aralkyl group or an arylalkyl group, and the like as well as a functional group usually referred to as an aryl group. The aryl group can be, for example, an aryl group having 6 to 25 carbon atoms, 6 to 21 carbon atoms, 6 to 18 carbon atoms, or 6 to 12 carbon atoms. As the aryl group, a phenyl group, a dichlorophenyl group, a chlorophenyl group, a phenylethyl group, a phenylpropyl group, a benzyl group, a tolyl group, a xylyl group or a naphthyl group, and the like can be exemplified.

In the present application, the term "alkoxy group" can mean an alkoxy group having 1 to 20 carbon atoms, 1 to 16 carbon atoms, 1 to 12 carbon atoms, 1 to 8 carbon atoms or 1 to 4 carbon atoms, unless otherwise specified. The alkoxy group can be linear, branched or cyclic. In addition, the alkoxy group can be optionally substituted with one or more substituents.

The specific type of polysilazane is not particularly limited as long as it includes the unit of Formula 1 above.

In one example, considering denseness of the modified polysilazane layer and the like, as the polysilazane of the present application, polysilazane containing the unit of Formula 1 in which all of $R^1$ to $R^3$ are hydrogen atoms, for example, perhydropolysilazane can be used.

In one example, the polysilazane layer can be formed, for example, by coating a composition (a coating liquid comprising polysilazane as a main component) prepared by dissolving polysilazane in a suitable organic solvent onto a base layer (base film). The type of the solvent contained in the coating liquid is not particularly limited as long as it is a solvent that has no reactivity with polysilazane and simultaneously is capable of dissolving it. For example, hydrocarbon solvents such as aliphatic hydrocarbons, alicyclic hydrocarbons and aromatic hydrocarbons, halogenated hydrocarbon solvents, ethers such as aliphatic ethers and alicyclic ethers can be used. Specifically, hydrocarbons such as pentane, hexane, cyclohexane, toluene, xylene, Solvesso and carbene, halogen hydrocarbons such as methylene chloride and trichloroethane, ethers such as dibutyl ether, dioxane and tetrahydrofuran and the like can be used as a solvent.

In one example, a commercialized polysilazane or a composition comprising the same can be used. For example, a polysilazane commercialized product such as AQUAMICA (registered trademark) NN120-10, NN120-20, NAX120-10, NAX120-20, NN110, NN310, NN320, NL110A, NL120A, NL150A, NP110, NP140, or SP140 manufactured by AZ Electronic Materials Kabushiki Kaisha can be used, without being limited thereto.

When the thickness of the polysilazane layer coated on the base layer is too thin, the coating process is not smooth and the barrier property cannot be sufficiently secured. Then, when the thickness is too large, cracks (damage) can occur due to shrinkage of the polysilazane layer during the curing process. The thickness of the polysilazane layer to be coated is not particularly limited, but considering the above points, the lower limit can be, for example, about 20 nm or more, 30 nm or more, 40 nm or more, 50 nm or more, 60 nm or more, 70 nm or more, 80 nm or more, 90 nm or more, or 100 nm or more. Then, the upper limit can be, for example, 800 nm or less, 700 nm or less, 600 nm or less, 500 nm or less, 400 nm or less, 300 nm or less, or 200 nm or less. The thickness in the above range is the thickness of the polysilazane layer formed on one side of the base layer, which can be, for example, the thickness of the polysilazane layer which is a single layer formed by applying the composition once.

The thickness of the cured layer obtained by curing the polysilazane layer having the above thickness can be determined, for example, according to the thickness of the polysilazane layer as described above. Furthermore, the thickness of the barrier layer comprising one or more cured layers can be appropriately adjusted in accordance with the number of cured layers or polysilazane layers within a range of 1,500 nm or less.

The polysilazane layer comprises a particle component in addition to the polysilazane.

In this connection, in the present application, the polysilazane layer has a surface ($S_1$) of a concavo-convex structure formed by protruding particles. Accordingly, the cured layer, which is a cured product of the polysilazane layer, also has a surface ($S_2$) of a concavo-convex structure formed by protruding particles. Then, the barrier layer (B) comprises a cured layer having the surface ($S_2$) of the concavo-convex structure as above. In the present application, the cured layer and the polysilazane layer are distinguished from each other depending on whether or not they are cured, but the surfaces of the concavo-convex structure in which the particles protrude can be expressed as the surface (S) without distinguishing from the cured layer and the polysilazane layer, respectively.

The barrier layer (B) can comprise one or more cured layers. For example, the barrier layer (B) can have a structure in which one or more cured layers (derived from polysilazane) having the surface (S) formed by the protruding particles are laminated. Specifically, the barrier layer (B) can be a cured layer having a surface (S) of a concavo-convex structure (single layer structure). Alternatively, the barrier layer (B) can comprise a plurality of cured layers ($b_1$) having the surface (S) of the concavo-convex structure, as a cured layer ($b_{11}$) having a surface of a concavo-convex structure and another cured layer ($b_{12}$) having a surface (S) of a concavo-convex structure are laminated. At this time, the number of the cured layers having the concavo-convex structure is not particularly limited, but can be appropriately adjusted within the thickness range of the barrier layer (B) as described above.

In another example, the barrier layer (B) can comprise both of a cured layer (derived from polysilazane) having a surface (S) formed by a concavo-convex structure and a cured layer (derived from polysilazane) having no surface (S) of a concavo-convex structure. For example, when a cured layer having a concavo-convex structure is referred to as a cured layer $b_1$ or $b_{1n}$ and a cured layer having no concavo-convex structure (a cured layer of a non-concavo-convex structure) is referred to as a cured layer $b_2$ or $b_{2m}$, the barrier layer (B) can have a laminated structure such as $b_{11}/b_{12}$, $b_1/b_2$, $b_{11}/b_2/b_{12}$, $b_{11}/b_{12}/b_2$, $b_{11}/b_{12}/b_2b_{13}$, $b_{11}/b_{12}/b_{21}b_{22}$, or $b_{11}/b_{12}/b_{21}/b_{22}/b_{13}$. The specific lamination sequence of the cured layer ($b_1$) and the cured layer ($b_2$) and the number of the respective layers are not particularly limited, but considering the damage of the barrier film or the roll-to-roll processability, it is advantageous that the cured layer ($b_1$ or $b_{1n}$) having a surface concavo-convex structure is located on the outermost layer of the barrier layer (B).

In one example, the barrier layer can comprise only the cured layer derived from polysilazane. For example, it may not comprise any metal layer formed by vapor deposition.

The surface (S) can be formed on at least one surface of the polysilazane layer.

In one example, the surface (S) can be the opposite surface of the polysilazane layer surface facing the base layer (A). That is, in the polysilazane layer, the surface (S) of the concavo-convex structure formed by protruding particles can be included on the opposite side of the polysilazane layer surface facing the base layer (A). Similarly, in the cured layer, the surface (S) of the concavo-convex structure formed by protruding particles can be included on the opposite side of the cured layer surface facing the base layer (A), and in the barrier layer, the surface (S) of the concavo-convex structure can also be included on the opposite side of the barrier layer surface facing the base layer (A).

When a series of processes of coating and curing the polysilazane layer is performed using a roll-to-roll process, the cured layer or polysilazane layer without any concavo-convex structure adheres to a guide roll of roll-to-roll equipment while being in direct contact therewith. When the transfer is performed in this contact state, scratch-like damage can occur to the surface of the cured layer or the polysilazane layer which is directly contacted. Particularly, since the polysilazane layer having a barrier function or the layer structure derived therefrom has a thin thickness, such as a thickness on the order of nanometers (nm), the barrier properties against moisture and the like are deteriorated even by slight surface damage. In view of this point, the present application forms a concavo-convex structure formed by protruding particles on a surface of a polysilazane layer or a cured layer to reduce direct contact between the polysilazane layer or the cured layer and the guide roll, and prevents damage of a barrier layer. Such surface irregularities can also improve transfer processability (running property or slip property) of the film using the roll-to-roll.

The surface (S) of the concavo-convex structure formed by protruding particles can impart a predetermined friction coefficient and concavo-convex height to a polysilazane layer, a cured layer or a film comprising the same.

The film of the present application can have a constant friction coefficient. Specifically, in order to measure a friction coefficient according to the method described in the following experimental example, the force (force pulling the film) required for transferring the film comprising the polysilazane layer or the like must be constant. The friction coefficient cannot be calculated unless the pulling force is constant. That is, it cannot have a friction coefficient. In theory, the friction coefficient can be 1.0 or less, and in the present application, the friction coefficient can satisfy a predetermined value, which is described below, in order to improve the slip property of the film or the running property of the film.

In one example, the polysilazane layer or the cured layer thereof can have a kinetic friction coefficient of 0.4 or less. Specifically, the kinetic friction coefficient can be 0.35 or less, 0.30 or less, or 0.25 or less. The kinetic friction coefficient can be measured according to the method described in the following experimental example. The fact that the kinetic friction coefficient satisfies 0.4 or less means that the direct contact between the polysilazane layer or the cured layer and the guide roll is reduced. Accordingly, damage to the barrier layer can be prevented. In addition, when it satisfies the value of the kinetic friction coefficient, the greater force is not required to transfer the film than when it exceeds the above value, so that the running property (slip property) of the film can be improved. As the kinetic friction coefficient has a lower value, it can be more advantageous, and thus the lower limit of the static friction coefficient is not particularly limited, but can be, for example, 0.01 or more, 0.05 or more, 0.1 or more, or 0.15 or more. Furthermore, at the time of manufacturing the barrier film, a process of coating a polysilazane composition (formation of a polysilazane layer) and curing the coated composition (formation of a cured layer) can be performed, and the barrier layer can also comprise a plurality of polysilazane-derived cured layers ($b$, $b_1$, and/or $b_2$) (that is, the coating and curing process of a polysilazane composition for forming a cured layer can be repeated), so that it is advantageous that both of the kinetic friction coefficient of the polysilazane coating layer before curing and the kinetic friction coefficient of the cured layer after curing satisfy the kinetic friction coefficient value.

In one example, the polysilazane layer or the cured layer thereof can have a static friction coefficient of 0.4 or less. Specifically, the static friction coefficient can be 0.35 or less, 0.30 or less, or 0.25 or less. The static friction coefficient can be measured according to the method described in the following experimental example. For example, in the initial stage of running (transfer) of a film (e.g., a release film, a base layer or the like on which a polysilazane layer is formed) using the roll-to-roll, the running of the film has been stopped and then rerun, and thus the static friction coefficient of the polysilazane layer or the cured layer thereof should be 0.4 or less. When it satisfies the above value, damage to the barrier layer can be prevented and the running property of the film can be improved. As the static friction coefficient has a lower value, it can be more advantageous, and thus the lower limit of the static friction coefficient is not particularly limited, but can be, for example, 0.01 or more, 0.05 or more, 0.1 or more, or 0.15 or more. Furthermore, at the time of manufacturing the barrier film, a process of coating a polysilazane composition (formation of a polysilazane layer) and curing the coated composition (formation of a cured layer) can proceed, and the barrier layer can also comprise a plurality of cured layers (that is, the coating and curing process of a polysilazane composition for forming a cured layer can be repeated), so that it is advantageous that both of the static friction coefficient of the polysilazane coating layer before curing and the static friction coefficient of the cured layer after curing satisfy the value.

In one example, the surface (S) of the concavo-convex structure can have a height of particles protruded from the surface (S), of 5 nm or more, when measured by an AFM (atomic force microscope). Specifically, in the surface (S), the difference (height or distance) between 'the maximum height of the protruding particles ($P_1$)' and 'the point closest to the particle among the surface (S) of the cured layer contacting the particles ($P_1$)' can be 5 nm or more. At this time, the point closest to the particle in the surface of the cured layer means any point of a matrix component (for example, a component derived from polysilazane, forming a continuous phase) except for particles among the components forming the cured layer. When the height is satisfied, it can be advantageous to secure the above-described friction coefficient, damage to the barrier layer can be prevented, and the processability (running property or slip property of the film) of the roll-to-roll process can be improved. Specifically, the height of the protruded particles can be 10 nm or more, 15 nm or more, 20 nm or more, 25 nm or more, 30 nm or more, 35 nm or more, 40 nm or more, 45 nm or more, or 50 nm or more. The upper limit of the height of the protruded particles can be, for example, 180 nm or less, 170 nm or less, 160 nm or less, 150 nm or less, 140 nm or less, 130 nm or less, 120 nm or less, 110 nm or less, or 100 nm or less.

Although not particularly limited, an example of a method of forming the surface (S) satisfying the protruding height of particles, the kinetic friction coefficient and/or the static friction coefficient as described above is as follows.

In one example, for forming the surface (S), it is possible to use a method of using low-density particles when preparing a polysilazane-containing composition. Specifically, when polysilazane, an organic solvent and particles are mixed to prepare a composition for forming a polysilazane layer, a method of using relatively low-density particles to protrude the particles to the polysilazane layer surface applied on a film by buoyancy can be used.

In another example, a method of controlling the thickness and particle diameter of the polysilazane layer can be used, in consideration of the thickness of the cured layer to be formed. Particularly, particles having a diameter larger than the thickness (height) of the polysilazane layer or the cured layer can be used. When the particle diameter is satisfied, the concavo-convex structure can be formed more easily. For example, when the (maximum) height of the polysilazane layer or the cured layer is in a level of about 100 nm, particles having a diameter of at least 105 nm can be used. However, when the diameter of the particles is larger than the thickness of the layer, there is a disadvantage that the interface between the particles and the polysilazane (or a cured product thereof) can act as a defect, and thus it is necessary to appropriately adjust the content thereof so that the amount of the particles used is not excessive.

In another example, another method of forming the surface (S) is a method of using components having degrees of hydrophobicity or hydrophilicity different from each other at the time of preparing a polysilazane-containing composition. Specifically, when particles having a diameter smaller than the thickness of the polysilazane layer or the cured layer are used, relatively more hydrophobic particles or more hydrophilic particles can be used as compared with the solvent or polysilazane component used in the composition. When the hydrophobic properties or the hydrophilic properties are different from each other as above, the particles can exist in a floating state on the surface of the polysilazane layer, and the curing can be performed while maintaining the above state. It can be determined depending on the characteristics (e.g., components) of the particles themselves whether the particles are hydrophobic or hydrophilic. Alternatively, hydrophobicity or hydrophilicity can be imparted to the particles through surface treatment with a hydrophobic functional group or a hydrophilic functional group. It is not uniformly determined whether the particles are hydrophobic or hydrophilic, which can be determined in relation to other components (for example, solvent or polysilazane) in the composition to be used together, and can be relatively judged, generally considering whether or not the polarity of the compound or functional group forming the particle surface is, or the length of the carbon chain in the compound, and the like. For example, when the thickness of the polysilazane layer or the cured layer is in a level of 120 to 150 nm, the diameter of the particles can be controlled within the range of about 80 to 100 nm, and the particles can be allowed to exist in a floating state on the surface (S) of the polysilazane layer by controlling the particle surface characteristics. The method of using particles having a smaller diameter than the thickness of the polysilazane layer or the cured layer can be more advantageous for securing the barrier property of the film than the other methods.

In the present application, organic particles and/or inorganic particles can be used as the particle component. The shape of the particles is not particularly limited. For example, the particles can be spherical, ellipsoidal, pyramidal, or amorphous.

The diameter (particle diameter) of the particles to be used is not particularly limited, which can be appropriately adjusted so as to have the above-described concavo-convex structure. In the present application, the diameter of the particles can mean the length of the longest dimension among the shapes of the particles, which can be measured using a known scanning electron microscope (SEM).

For example, the particles can have a diameter of 5 nm or more. More specifically, particles having a diameter of 10 nm or more, 15 nm or more, 20 nm or more, 25 nm or more, 30 nm or more, 35 nm or more, 40 nm or more, 45 nm or more, 50 nm or more, 55 nm or more, 60 nm or more, 65 nm or more, 70 nm or more, 75 nm or more, or 80 nm or more can be used, and the upper limit thereof can be, for example, 200 nm or less, 150 nm or less, or 100 nm or less. The diameters of the particles to be used need not be all the same, and it is sufficient to satisfy the particle diameters within the above range, thereby forming the above-described concavo-convex structure. For example, as described above, when the degree of hydrophilicity of the particles is controlled to form a concavo-convex structure, the diameter of the particles is about 30 nm or more, which can have a size of about ¾, ½ or ¼ or less of the thickness of the polysilazane layer or the cured layer.

In one example, when the barrier layer (B) comprises a plurality of cured layers (e.g., $b_{11}$ and $b_{12}$, $b_1$ and $b_2$, or $b_{1n}$ and $b_{2n}$), the diameter of the particles forming surface (S) irregularities of the cured layer (for example, $b_1$) adjacent to the base layer can be smaller than the thickness of the other cured layer ($b_2$) located on the cured layer ($b_1$). For example, the diameter of the particles included in the cured layer ($b_1$) can have a size of about ¾, ½ or ¼ or less relative to the thickness of the cured layer ($b_2$).

In one example, as the particle component, inorganic particles selected from clay, talc, alumina, calcium carbonate, zirconia and silica particles can be used. As compared with the organic particle component, the inorganic particle component has better barrier properties against moisture and the like, and thus it can be advantageous for improving the blocking property (barrier property) of the film against the external environment to use the inorganic particles.

In one example, the use content of the particles can be 5 parts by weight or less relative to 100 parts by weight of polysilazane. If the content exceeds the above range, the barrier property can be deteriorated, while the water vapor transmission rate increases. This is because the interface of the particles can act as a defect. For example, the content of the particles can be 4 parts by weight or less, 3.5 parts by weight or less, 3.0 parts by weight or less, 2.5 parts by weight or less, 2.0 parts by weight or less, 1.5 parts by weight or less, or 1.0 part by weight or less. The lower limit thereof is not particularly limited, but can be, for example, 0.05 parts by weight or more, 0.10 parts by weight or 0.5 parts by weight or more. Assuming that the content of the particles satisfies the above range, as more particles are used, it can be more advantageous for forming the irregularities of the above-described characteristics.

In one example, the number of particles observed on the surface (S) can be in a range of 0.8 to 3.0/$\mu m^2$. For example, the number of particles observed per unit area ($\mu m^2$) on the surface (S) can be 0.9/$\mu m^2$ or more, 1.0/$\mu m^2$ or more, 1.1/$\mu m^2$ or more, 1.2/$\mu m^2$ or more, 1.3/$\mu m^2$ or more, 1.4/$\mu m^2$ or more, 1.5/$\mu m^2$ or more, 1.6/$\mu m^2$ or more, 1.7/$\mu m^2$ or more, 1.8/$\mu m^2$ or more, 1.9/$\mu m^2$ or more, 2.0/$\mu m^2$ or more, and can be 2.9/$\mu m^2$ or less, 2.8/$\mu m^2$ or less, 2.7/$\mu m^2$ or less, or 2.6/$\mu m^2$ or less. If the number of particles exceeds the above range, the number of particles protruding to the surface (S) can be excessive, which can adversely affect the mechanical strength of the film. In addition, when the number of particles is less than the above range, it can be disadvantageous for securing the surface irregularities as described above. The number of the particles can be obtained by obtaining an SEM image having a magnification of ×50,000 with respect to a predetermined area (width $\mu m$×height $\mu m$) of the polysilazane layer or the cured layer and confirming the number of particles observed on the surface. In one example, the identification of the number of particles can be made several times, for example three times or five times, and the average value can be taken as the number of the particles.

In one example, the polysilazane layer can further comprise organic particles. The organic particles can be, for example, acrylic particles as a polymer component having the above diameter. The content of the organic particles is not particularly limited, but for example, when used in combination with the inorganic particles, the organic particles can be used so that the total content of the organic and inorganic particles can satisfy 5 parts by weight or less relative to 100 parts by weight of polysilazane.

In one example, the barrier layer (B) and the base layer (A) can be in contact with each other. For example, the cured layer constituting the barrier layer (B) can be directly located on one side or both sides of the base layer (A). At this time, the barrier layer can have a constitution in which a plurality of cured layers derived from polysilazane (for example, $b_{11}$ and $b_{12}$, $b_1$ and $b_2$, or $b_{1n}$ and $b_{2n}$ and the like) is laminated.

In another example, the film can further comprise an intermediate layer (C) between the base layer (A) and the barrier layer (B). For example, the barrier film can be a film formed by coating a polysilazane composition on an adherend for coating comprising a base layer (A) and an intermediate layer (C) formed on one side or both sides of the base layer, followed by curing. In some cases, the base layer can have irregularities (for example, irregularities in a level of several tens of nm, several hundred nm or several thousand nm or several $\mu m$) on the surface on which the barrier layer is formed, where the irregularities can hinder stable formation of a cured layer, since they are usually large as compared to the thickness at which the cured layer is formed. In consideration of this point, the barrier film can further comprise an intermediate layer (C) as a planarization layer which provides a flat surface on which a cured layer can be formed.

The intermediate layer can comprise one or more materials selected from the group consisting of, for example, an acrylic resin, a urethane resin, a melamine resin, an alkyd resin, an epoxy resin, a siloxane polymer and/or a condensation product of an organosilane compound of Formula 2 below:

Formula 2

In Formula 2, X can be hydrogen, halogen, an alkoxy group, an acyloxy group, an alkyl carbonyl group, an alkoxycarbonyl group, or —N(R2)$_2$, where R2 can be hydrogen or an alkyl group, $R_1$ can be an alkyl group, an alkenyl group, an alkynyl group, an aryl group, an arylalkyl group, an alkylaryl group, an arylalkenyl group, an alkenylaryl group, an arylalkynyl group, an alkynylaryl group, halogen, an amino group, an amide group, an aldehyde group, an alkylcarbonyl group, a carboxy group, a mercapto group, a cyano group, a hydroxy group, an alkoxy group, an alkoxycarbonyl group, a sulfonyl group, a phosphoryl group, an acryloyloxy group, a methacryloyloxy group or an epoxy group, Q can be a single bond, an oxygen element or —N(R2)-, where R2 can be a hydrogen or an alkyl group, and m can be a number in a range of 1 to 3.

As the organosilane, at least one compound selected from the group consisting of the compounds of Formula 2 above can be used, where if one organosilane compound is used, crosslinking can be possible.

The organic silane can be selected, as an example, from the group consisting of methyl trimethoxysilane, methyl triethoxysilane, phenyl trimethoxysilane, phenyl triethoxysilane, dimethyl dimethoxysilane, dimethyl diethoxysilane, diphenyl dimethoxysilane, diphenyl diethoxysilane, phenyl dimethoxysilane, phenyl diethoxysilane, methyl dimethoxysilane, methyl diethoxysilane, phenylmethyl dimethoxysilane, phenylmethyl diethoxysilane, trimethyl methoxysilane, trimethyl ethoxysilane, triphenyl methoxysilane, triphenyl ethoxysilane, phenyldimethyl methoxysilane, phenyldimethyl ethoxysilane, diphenylmethyl methoxysilane, diphenylmethyl ethoxysilane, dimethyl ethoxysilane, dimethyl ethoxysilane, diphenyl methoxysilane, diphenyl ethoxysilane, 3-aminopropyl triethoxysilane, 3-glycidoxypropyl trimethoxysilane, p-aminophenylsilane, allyl triethoxysilane, N-(2-aminoethyl)-3-aminopropyl trimethoxysilane, 3-aminopropyl triethoxysilane, 3-aminopropyl trimethoxysilane, 3-glycidoxypropyldiisopropyl ethoxysilane, (3-glycidoxypropyl)methyl diethoxysilane, 3-glycidoxypropyl trimethoxysilane, 3-mercaptopropyl trimethoxysilane, 3-mercaptopropyl triethoxysilane, 3-methacryl-oxypropylmethyl diethoxysilane, 3-methacryloxypropylmethyl dimethoxysilane, 3-methacryloxypropyl trimethoxysilane, N-phenylaminopropyl trimethoxysilane, vinylmethyl diethoxysilane, vinyl triethoxysilane, vinyl trimethoxysilane, and a mixture thereof, and used.

In another example, the intermediate layer can be produced by polymerizing one or more polyfunctional acrylates. As the kind of the polyfunctional acrylate, for example, bifunctional acrylates such as 1,4-butanediol di(meth)acrylate, 1,6-hexanediol di(meth)acrylate, neopentyl glycol di(meth)acrylate, polyethylene glycol di(meth)acrylate, neopentylglycol adipate di(meth)acrylate, hydroxypivalic acid neopentyl glycol di(meth)acrylate, dicyclopentanyl di(meth)acrylate, caprolactone modified dicyclopentenyl di(meth)acrylate, ethylene oxide modified di(meth)acrylate, di(meth)acryloxyethyl isocyanurate, allylated cyclohexyl di(meth)acrylate, tricyclodecane dimethanol (meth)acrylate, dimethylol dicyclopentane di(meth) acrylate, ethylene oxide modified hexahydrophthalic acid di(meth)acrylate, tricyclodecane dimethanol (meth)acrylate, neopentyl glycol modified trimethylpropane di(meth)acrylate, adamantane di(meth)acrylate or 9,9-bis[4-(2-acryloyloxyethoxy)phenyl]fluorene; trifunctional acrylates such as trimethylol-propane tri(meth)acrylate, dipentaerythritol tri(meth)acrylate, propionic acid modified dipentaerythritol tri(meth)acrylate, pentaerythritol tri(meth)acrylate, propylene oxide modified trimethylolpropane tri(meth)acrylate, trifunctional urethane (meth)acrylate or tris(meth)acryloxyethyl isocyanurate; tetrafunctional acrylates such as diglycerin tetra(meth)acrylate or pentaerythritol tetra(meth)acrylate; pentafunctional acrylates such as propionic acid modified dipentaerythritol penta(meth)acrylate; and hexafunctional acrylates such as dipentaerythritol hexa(meth) acrylate, caprolactone modified dipentaerythritol hexa(meth)acrylate or urethane (meth)acrylate (e.g. a reaction product of an isocyanate monomer and trimethylolpropane tri(meth)acrylate), and the like can be used, without being limited thereto.

In one example, the intermediate layer can comprise a fluorine-based compound. For example, a fluorine-based (meth)acrylate or a fluorine-based siloxane compound can be used. Although not particularly limited, a perfluoro compound such as perfluoropolyether acrylate can be used as the fluorine-based (meth)acrylate, and an alkoxysilane compound substituted with a fluorine-containing chain can be used as the fluorine-based siloxane compound.

As the epoxy resin applicable to the formation of the intermediate layer, at least one selected from the group consisting of an alicyclic epoxy resin and an aromatic epoxy resin can be used.

As the alicyclic epoxy resin, for example, at least one selected from the group consisting of an alicyclic glycidyl ether type epoxy resin and an alicyclic glycidyl ester type epoxy resin can be used. Also, for example, 3,4-epoxycyclohexyl-methyl-3,4-epoxy cyclohexane carboxylate, which is Celloxide 2021P (Daicel Co.), and derivatives thereof can be used, which are stable even at high temperatures, colorless and transparent, and have excellent toughness, adhesion and adhesiveness for lamination. Especially, when used for coating, they have excellent surface hardness.

As the aromatic epoxy resin, for example, at least one aromatic epoxy resin selected from the group consisting of a bisphenol A type epoxy resin, a brominated bisphenol A type epoxy resin, a bisphenol F type epoxy resin, a bisphenol AD type epoxy resin, a fluorene-containing epoxy resin and triglycidyl isocyanurate can also be used.

The intermediate layer can be, for example, a coating layer formed by a sol-gel reaction. For example, at least one selected from the group consisting of SiOx (where, x is an integer of 1 to 4), SiOxNy (where, x and y are each an integer of 1 to 3), $Al_2O_3$, $TiO_2$, ZrO and ITO can also be included in the intermediate layer.

The intermediate layer can also comprise a metal alkoxide of Formula 3 below, or a condensation product thereof.

$$M\!-\!\!\left[R_3\right]_z \quad \text{Formula 3}$$

In Formula 3, M can be any one metal selected from the group consisting of aluminum, zirconium, and titanium, R3 can be halogen, an alkyl group, an alkoxy group, an acyloxy group, or a hydroxy group, and z can be 3 or 4.

In one example, the intermediate layer can further comprise a filler. The filler can be used in consideration of, for example, adjusting the refractive index of the intermediate layer and/or adjusting the mechanical strength, and the like. In one example, as the filler, at least one selected from the group consisting of CaO, $CaF_2$, MgO, $ZrO_2$, $TiO_2$, $SiO_2$, $In_2O_3$, $SnO_2$, $CeO_2$, BaO, $Ga_2O_3$, ZnO, $Sb_2O_3$, NiO and $Al_2O_3$ can be used.

The method of forming the intermediate layer using the above materials is not particularly limited and known methods, for example, various dry and/or wet coating methods such as a deposition method and a sol-gel coating method, can be used depending on the materials to be used. After the coating, suitable curing (e.g., thermal curing or photocuring, etc.) can be made depending on the used resin.

The thickness of the intermediate layer is not particularly limited. For example, it can be 50 μm or less. Specifically, the upper limit of the thickness can be 40 μm or less, 30 μm or less, 20 μm or less, 10 μm or less, or 5 μm or less, and the lower limit can be 0.5 μm or more, or 1 μm or more.

In one example, the barrier film of the above configuration can be a film that satisfies the intended transmittance and barrier properties.

With respect to transmittance, the barrier film can mean a film having a transmittance of 90% or more, or 95% or more for visible light in a wavelength range of 380 nm to 780 nm, specifically, light having a wavelength of 550 nm. The upper limit of the transmittance is, for example, about 100%, where the film can have transmittance of less than 100%.

With respect to the barrier properties, the barrier film of the present application can have a water vapor transmission rate of 10 mg/m$^2$ day or less, as measured at a temperature of 38° C. and 100% relative humidity. Specifically, the water vapor transmission rate can be 9 mg/m$^2$·day or less, 8 mg/m$^2$·day or less, 7 mg/m$^2$·day or less, 6 mg/m$^2$·day or less, or 5 mg/m$^2$·day or less. Since the water vapor transmission rate means that the lower the value thereof, the relevant layer exhibits more excellent barrier properties, the lower limit of the water vapor transmission rate is not particularly limited. In one example, the lower limit of the water vapor transmission rate can be 0.001 mg/m$^2$·day or more, 0.005 mg/m$^2$·day or more, 0.01 mg/m$^2$·day or more, 0.02 mg/m$^2$·day or more, 0.03 mg/m$^2$·day or more, 0.04 mg/m²·day or more, 0.05 mg/m² day or more, or 0.06 mg/m² day or more. The water vapor transmission rate can be measured according to a known method, and for example, can be measured according to the ISO 15106-3 standard.

In another example of the present application, the present application relates to a method for producing a barrier film. The method can comprise a step of curing a polysilazane layer formed on a base layer.

In one example, as the base layer, the same base layer as described above can be used. The polysilazane layer can be a layer formed by being directly applied on the base layer.

In one example, the polysilazane layer can be a layer formed by being directly applied on the base layer. The polysilazane layer is formed by applying the above-described polysilazane-containing composition onto a base material, which can comprise polysilazane as a main component and particles. In addition, the composition for forming a polysilazane layer can further comprise a solvent. The details of the polysilazane, particles and solvent are the same as those mentioned above.

In one example, the polysilazane layer can be a layer formed by being applied on an intermediate layer. In this case, the intermediate layer can be a layer previously formed on the base layer. The constitution of the intermediate layer can be formed from the same constitution as described above.

The transfer target in the roll-to-roll process can be a base layer (or base film). That is, the base film can be transferred by a roll according to a roll-to-roll manner. For example, the base film can be transferred by a conveyor belt or the like while being wound around a roll and unwound, and a polysilazane layer can be formed on the base film in the transfer process. Similarly, the transfer target in the roll-to-roll process can be a laminate of a base layer and a polysilazane layer or a laminate of a base layer, an intermediate layer and a polysilazane layer. In this transfer process, the base layer or the laminate can be in contact with a roll.

The coating method of forming the polysilazane layer is not particularly limited as long as the polysilazane composition can be continuously applied on the base layer during the transfer of the base layer so that it can be used in the roll-to-roll process. As a method of applying the composition, for example, roll coating, spin coating, dip coating, flow coating, spray coating and the like can be used.

Since the polysilazane layer applied on the base layer has a certain degree of hardness, it can be applied to a roll-to-roll process. For example, although the hardness of the polysilazane layer before curing is less than that after curing, it can be about 1B or so as measured according to a known hardness measurement method (e.g., ASTM D3360).

In one example, the formation of a cured layer, that is, the curing for the polysilazane layer can be effected by plasma treatment.

The plasma treatment is performed by generating plasma under an atmosphere containing a plasma generation gas such as Ar and injecting positive ions in the plasma to the polysilazane layer, where the plasma can be generated, for example, by an external electric field or a negative high voltage pulse. This plasma treatment can be performed using a known apparatus.

The plasma treatment for forming the cured layer can be performed while injecting a discharge gas (Ar) and oxygen in a predetermined processing space. More specifically, the plasma treatment can be performed under the following conditions.

In one example, the plasma treatment can be performed under a predetermined power density. Specifically, the power density per unit area of the electrode upon the plasma treatment can be about 0.05 W/cm² or 0.10 W/cm² or more. In another example, the power density can be about 0.2 W/cm² or more, about 0.3 W/cm² or more, about 0.4 W/cm² or more, about 0.5 W/cm² or more, about 0.6 W/cm² or more, about 0.7 W/cm² or more, 0.8 W/cm² or more, or about 0.9 W/cm² or more. Within the range that satisfies the power density, in the case of the positive electrode, the higher the power density, the degree of plasma treatment can be increased for a short time and the degree of modification of the polysilazane due to application of a high voltage can be increased. In the case of the negative electrode, the excessively high power density can cause damage to the base layer due to a high voltage, and thus considering this point, the upper limit of the power density can be about 2 W/cm² or less, 1.5 W/cm² or less, or 1.0 W/cm² or less.

In one example, in the case of having the power density, the processing energy upon the plasma treatment, which is determined by multiplying the power density by the processing time, can be 50 J/cm² or less. Specifically, the energy can be 45 J/cm² or less, 40 J/cm² or less, 35 J/cm² or less, 30 J/cm² or less, 25 J/cm² or less, 20 J/cm² or less, and the lower limit can be 5 J/cm² or more, 10 J/cm² or more, or 15 J/cm² or more.

In one example, the plasma treatment can be performed under a predetermined process pressure. Specifically, the process pressure upon the plasma treatment can be 350 mTorr or less. In the case of the positive electrode, the lower the process pressure, the easier the average free path is secured, and thus the plasma treatment can be performed without energy loss due to collision with gas molecules. For example, the process pressure can be 340 mTorr or less, 330 mTorr or less, 320 mTorr or less, 310 mTorr or less, 300 mTorr or less, 290 mTorr or less, 280 mTorr or less, 270 mTorr or less, 260 mTorr or less, 250 mTorr or less, 240 mTorr or less, 230 mTorr or less, 220 mTorr or less, 210 mTorr or less, or 200 mTorr or less. On the other hand, in the case of the negative electrode, the lower the process pressure is, the less the gas molecules are, and thus high voltage and power can be required to generate the plasma, where the high voltage and the high power can cause damage to the base layer, and for example, the lower limit can be 50 mTorr or more, 60 mTorr or more, 70 mTorr or more, 80 mTorr or more, 90 mTorr or more, 100 mTorr or more, 110 mTorr or more, 120 mTorr or more, 130 mTorr or more, 140 mTorr or more, 150 mTorr or more, 160 mTorr or more, 170 mTorr or more, 180 mTorr or more, or 190 mTorr or more. The pressure can be a pressure at the beginning of the process and the pressure can be maintained within the range during the process.

When the discharge gas (Ar) and oxygen are used as process gases, the vapor pressure of oxygen in the processing space can be in a range of 20 to 80%. The oxygen vapor pressure means the injection flow rate percentage of the injected oxygen relative to the total flow rate of gases injected into the processing space. For example, in the case of performing the plasma treatment while injecting Ar and O2 at flow rates of A sccm and B sccm, respectively, the vapor pressure of oxygen can be calculated as $100 \times B/(A+B)$. The flow rate of each gas can be adjusted at a level that satisfies the vapor pressure.

The plasma treatment time can be appropriately adjusted at a level that does not hinder the barrier properties of the film. For example, the plasma treatment can be performed for a time of about 10 seconds to 10 minutes.

In one example, the method can further comprise a heating step for the polysilazane layer prior to performing the plasma treatment. The heating can be performed, for example, in the range of 40 to 150° C. for several minutes to several hours. After the solvent is evaporated through the heating, the plasma treatment can be performed.

The film of the present application has excellent barrier properties. Accordingly, it can be used as a barrier film or a sealing film in various applications such as various packaging materials, displays such as LCD (liquid crystal display), members for solar cells, electronic papers or substrates for OLED (organic light emitting diode). Particularly, the barrier film formed in the above-described manner has excellent optical performances such as transparency and thus can be effectively used in optical devices such as various display devices or lighting devices.

When used in these applications, the barrier film can be positioned so that the barrier layer (B) is adjacent to the target to be protected, i.e., the constitution vulnerable to moisture. For example, when the barrier film is attached to an OLED element, the order of lamination can be a base layer, a barrier layer and an OLED element. For the attachment, for example, a known lamination method can be used, or a known adhesive can be used.

Advantageous Effects

According to one example of the present application, a barrier film having excellent barrier properties against gas or moisture can be provided. In addition, the present application can improve slip properties of a film during a roll-to-roll process and prevent product defects.

BRIEF DESCRIPTION OF THE DRAWINGS

FIG. 1a shows an AFM (atomic force microscope) image that the barrier layer surface of the barrier film in Example 1 has, and FIG. 1b shows a line profile of the surface. Specifically, in FIG. 1a, the white solid line means a point where the line profile of FIG. 1b is measured. Then, FIG. 1b shows the irregularities of the cured layer measured at the point indicated by the white solid line, and the point where the longitudinal axis of the line profile is zero means that the average value of the surface heights of the organic component (polysilazane) excluding the particles in the cured layer, is converted to the reference value.

FIG. 2 is a schematic diagram for explaining the protruding height of the particle on the surface (S) of the concavo-convex structure in the present application.

FIGS. 3a and 3b show the results of measuring the friction coefficient three times for each of the films of Example 3 and Comparative Example 1. It can be seen that FIG. 3a illustrates results of Example 3 and shows that the pulling force converges to a constant value, and FIG. 3b illustrates results of Comparative Example 1 and shows that the pulling force exhibits very large variation widths and cannot converge to a constant value.

EXAMPLES

Hereinafter, the present application will be described in detail through examples. However, the protection scope of the present application is not limited by the following examples.

Experimental Example 1: Comparison of Friction Coefficients According to Surface Irregularity Formation Example 1

An intermediate layer having a thickness of about 900 nm was formed on the surface of a PET (poly(ethylene terephthalate)) base film having a thickness of about 50 μm using an isocyanurate-based acrylate.

Subsequently, a composition comprising a polysilazane solution (prepared by adding dimethylethanolamine (DMEA) as an organic catalyst to an NN 120 solution from CLAMANT in an amount of about 2 parts by weight relative to 100 parts by weight of polysilazane) and 0.7 parts by weight of hydrophobic silica particles (particle diameter is in a level of 80 nm to 100 nm) surface-treated with a an acrylic compound was coated on the intermediate layer to a thickness of about 150 nm (formation of polysilazane layer) and dried at 130° C. for 2 minutes. The coating layer of the dried film was passed through a guide roll of a roll curing machine in a state where constant tension was applied thereto, and the plasma treatment for the polysilazane layer was performed under conditions of a flow rate of $Ar:O_2$=about 1:1 (on the basis of sccm), a pressure of about 138 mTorr, a power of about 0.27 W/cm$^2$, and an energy of about 20 J/cm$^2$.

Example 2

A barrier film was produced in the same manner as in Example 1, except that in the polysilazane-containing composition, the trade name NL120 polysilazane (containing an inorganic catalyst different from DMEA) was used.

The evaluation results of the friction coefficients of the barrier films of Examples 1 and 2 are shown in Table 1.

Static friction coefficient and kinetic friction coefficient: In general, the friction coefficients of the polysilazane layer and the cured layer were measured for SUS (stainless steel) as the main material of the roll in which the film was wound and unwound in the roll-to-roll process. Specifically, according to the ASTM D1894 method, the SUS base material was placed on the surfaces (S) prepared in Examples and Comparative Examples, and the force of pulling the samples was measured in a state where a load of 200 g was applied thereto using a weight, and then the ratio between the load and the pulling force was measured.

TABLE 1

|  | Example 1 | | Example 2 | |
| --- | --- | --- | --- | --- |
|  | Static friction coefficient | Kinetic friction coefficient | Static friction coefficient | Kinetic friction coefficient |
| Friction coefficient before curing | 0.19 | 0.18 | 0.20 | 0.18 |
| Friction coefficient after curing | 0.18 | 0.17 | 0.20 | 0.18 |

As shown in Table 1, in the barrier film comprising silica particles so as to be capable of forming surface irregularities according to the present application, the kinetic friction coefficient and the static friction coefficient for to the surface (S) have a value of 0.4 or less. This means that the films of the examples can provide appropriate slip properties for the roll-to-roll process and the damage to the barrier film, which has occurred in the prior art, can be prevented.

Experimental Example 2: Comparison of Friction Coefficients According to Surface Irregularity Formation Example 3

An intermediate layer having a thickness of about 900 nm was formed on the surface of a PET (poly(ethylene terephthalate)) base film having a thickness of about 50 μm using an isocyanurate-based acrylate.

Subsequently, a composition comprising a polysilazane solution (prepared by adding dimethylethanolamine (DMEA) as an organic catalyst to an NN 120 solution from CLARIANT in an amount of about 2 parts by weight relative to 100 parts by weight of polysilazane), 0.7 parts by weight of hydrophobic silica particles (particle diameter is in a level of 80 nm to 100 nm) surface-treated with an acrylic series, and an amine-based curing catalyst was coated on the intermediate layer to a thickness of about 150 nm (formation of polysilazane layer) and dried at 130° C. for 2 minutes. The coating layer of the dried film was passed through a guide roll of a roll curing machine in a state where constant tension was applied thereto, and the plasma treatment for the polysilazane layer was performed under conditions of a flow rate of Ar: O2=about 1:1 (on the basis of sccm), a pressure of about 138 mTorr, a power of about 0.27 W/cm$^2$, and an energy of about 20 J/cm$^2$.

Example 4

A barrier film was produced in the same manner as in Example 3, except that in the polysilazane-containing composition, the trade name NL120 polysilazane (containing an inorganic catalyst different from DMEA) was used.

Comparative Example 1

A barrier film was produced in the same manner as in Example 3, except that the silica particles were not used.

Comparative Example 2

A barrier film was produced in the same manner as in Example 4, except that the silica particles were not used.

The evaluation results of the friction coefficients of the barrier films of Examples 3 and 4, and Comparative Examples 1 and 2 are shown in Table 2. The friction coefficient was measured in the same manner as in the previous experimental example.

TABLE 2

|  | Example | | Comparative Example | |
| --- | --- | --- | --- | --- |
|  | 3 | 4 | 1 | 2 |
| Static friction coefficient | 0.19 | 0.20 | not measurable | not measurable |
| Kinetic friction coefficient | 0.18 | 0.18 | not measurable | not measurable |

As in Table 2 above, in the case of the examples comprising silica particles so as to be capable of forming surface irregularities, the kinetic friction coefficient and the static friction coefficient can have a value of 0.4 or less, and accordingly, it can be seen that the slip properties are excellent in the roll-to-roll process and the damage to the polysilazane layer or the cured layer can be prevented.

For reference, as described in relation to the measuring method, the friction coefficient means the ratio between the load applied to the sample and the pulling force, where its size cannot exceed 1. The friction coefficient can be measured only when the magnitude of the pulling force is constant, and the fact that the friction coefficient is not measurable as in Comparative Examples 1 and 2 means that the pulling force is not constant and changes greatly. That is, in Comparative Examples 1 and 2, it can be confirmed that adequate slip properties required at the time of unwinding or winding in the roll-to-roll process are not ensured.

Experimental Example 3: Comparison of Water Vapor Transmission Rates (1)

Example 5

The barrier film produced in Example 1 above was used.

Example 6

The barrier film produced in Example 2 above was used.

Comparative Example 3

The same film as the barrier film produced in Example 5 was used, except that the silica particles were not included.

Comparative Example 4

The same film as the barrier film produced in Example 6 was used, except that the silica particles were not included.

The measurement results of the water vapor transmission rates of the barrier films of Examples 5 and 6, and Comparative Examples 3 and 4 are shown in Table 3.

Measuring method of water vapor transmission rate: Measuring equipment (MOCON Aquatron 1) was used and it was measured according to ISO 15106-3 standard at a temperature of 38° C. and 100% relative humidity.

TABLE 3

|  | Example | | Comparative Example | |
| --- | --- | --- | --- | --- |
|  | 5 | 6 | 3 | 4 |
| Water vapor transmission rate (mg/m$^2$ · day) | 3.4 | 5.5 | 11.8 | 15.8 |

As shown in Table 3, it can be confirmed that the barrier films of the examples have excellent barrier properties (low water vapor transmission rate). This is considered to be because the barrier films having surface irregularities according to the examples prevent damage to the barrier layers during the roll-to-roll process.

Experimental Example 4: Comparison of Water Vapor Transmission Rates (2)

Example 7

The barrier film produced in Example 1 was used (number of cured layers: 1).

Example 8

The barrier film produced in Example 2 was used (number of cured layers: 1).

Example 9

A barrier film comprising a PET base material, a planarization layer and a cured layer (1) of polysilazane was produced in the same manner as in Example 1, except that in the NN 120, the polysilazane was diluted to 4% with dibutyl ether.

A polysilazane layer was further formed on the cured layer (1) using a silazane coating liquid (in the NN 120, the polysilazane was diluted to 4% with dibutyl ether) at the same concentration, and the plasma treatment was performed under the same conditions as in Example 1 to further laminate an inorganic layer (2) (number of cured layers: 2).

Example 10

A barrier film comprising a PET base material, a planarization layer and a cured layer (1-1) of polysilazane was produced in the same manner as in Example 2, except that in the NL 120, the polysilazane was diluted to 4% with dibutyl ether.

A polysilazane layer was further formed on the cured layer (1) using a silazane coating liquid (in the NL 120, the polysilazane was diluted to 4% with dibutyl ether) at the same concentration, and the plasma treatment was performed under the same conditions as in Example 2 to further laminate an inorganic layer (2-1) (number of cured layers: 2).

The measurement results of the water vapor transmission rates of the barrier films of Examples 7 to 10 are shown in Table 4. The water vapor transmission rate was measured in the same manner as in the previous experimental example.

TABLE 4

| | Example | | | |
|---|---|---|---|---|
| | 7 | 8 | 9 | 10 |
| Water vapor transmission rate (mg/m² · day) | 3.8 | 4.3 | 0.04 | 0.03 |

As shown in Table 4, it can be confirmed that the barrier films having two or more cured layers having surface irregularities have a water vapor transmission rate superior to that of the barrier films formed of a single layer.

The invention claimed is:
1. A barrier film, comprising:
a base layer (A); and
a barrier layer (B) located on one side of the base layer and including a cured polysilazane layer formed by curing a polysilazane layer having a surface (S) of a concavo-convex structure formed by particles protruding from the surface,
wherein the polysilazane layer has an amount of polysilazane of 90% or more based on the weight of the polysilazane layer,
wherein the particles having a diameter smaller than a thickness of the polysilazane layer exist in a floating state on the surface of the polysilazane layer,
wherein the cured polysilazane layer having the surface of a concavo-convex structure is an outermost layer of the barrier layer,
wherein an amount of the particles is 0.05 parts by weight to 1 part by weight relative to 100 parts by weight of the polysilazane of the polysilazane layer, and
wherein the cured polysilazane layer has a static friction coefficient of 0.4 or less.

2. The barrier film according to claim 1, wherein the surface (S) is the opposite surface of the polysilazane layer surface facing the base layer (A).

3. The barrier film according to claim 1, wherein a polysilazane of the polysilazane layer has a unit of Formula 1 below:

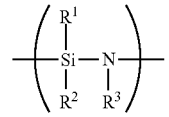

Formula 1 wherein, $R^1$, $R^2$ and $R^3$ are each independently a hydrogen atom, an alkyl group, an alkenyl group, an alkynyl group, an aryl group, an alkylsilyl group, an alkylamide group or an alkoxy group.

4. The barrier film according to claim 1, wherein the polysilazane layer or the cured layer thereof has a kinetic friction coefficient of 0.4 or less.

5. The barrier film according to claim 1, wherein the particles protruding from the surface (S) have a height of 5 nm or more when measured by an atomic force microscope (AFM).

6. The barrier film according to claim 1, wherein the polysilazane layer comprises particles having a diameter larger than the height of the polysilazane layer.

7. The barrier film according to claim 1, wherein the particles are inorganic particles selected from clay, talc, alumina, calcium carbonate, zirconia and silica particles.

8. The barrier film according to claim 1, wherein the particles are included in an amount of 5 parts by weight or less relative to 100 parts by weight of the polysilazane of the polysilazane layer.

9. The barrier film according to claim 1, wherein the particles have a diameter in a range of 5 to 200 nm.

10. The barrier film according to claim 1, further comprising an intermediate layer (C) between the base layer (A) and the barrier layer (B),
wherein the intermediate layer (C) comprises an acrylic resin, a urethane resin, a melamine resin, an alkyd resin, an epoxy resin, a siloxane polymer or a condensation product of an organosilane compound of Formula 2 below:

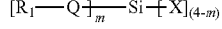

Formula 2 wherein:
X is hydrogen, halogen, an alkoxy group, an acyloxy group, an alkyl carbonyl group, an alkoxycarbonyl group, or $-N(R2)_2$, where R2 is hydrogen or an alkyl group;
$R_1$ is an alkyl group, an alkenyl group, an alkynyl group, an aryl group, an arylalkyl group, an alkylaryl group, an arylalkenyl group, an alkenylaryl group, an arylalkynyl group, an alkynylaryl group, halogen, an amino group, an amide group, an aldehyde group, an alkylcarbonyl group, a carboxy group, a mercapto group, a cyano group, a hydroxy group, an alkoxy group, an alkoxycarbonyl group, a sulfonyl group, a phosphoryl group, an acryloyloxy group, a methacryloyloxy group or an epoxy group;

Q is a single bond, an oxygen element or —N(R2)-, where R2 is hydrogen or an alkyl group; and m is a number in a range of 1 to 3.

11. The barrier film according to claim 1, wherein the barrier film has a water vapor transmission rate of 10 mg/m$^2$ day or less, as measured at a temperature of 38° C. and 100% relative humidity.

12. An electric or electronic element comprising the barrier film according to claim 1.

13. The barrier film according to claim 1, wherein the polysilazane layer has an amount of polysilazane of 95% or more based on the weight of the polysilazane layer.

14. The barrier film according to claim 1, wherein the particles include a hydrophobic or a hydrophilic functional group on a surface of the particles.

15. The barrier film according to claim 1, wherein the particles are hydrophobic silica particles surface-treated with an acrylic compound.

* * * * *